US011221499B2

(12) United States Patent
Jubin et al.

(10) Patent No.: US 11,221,499 B2
(45) Date of Patent: Jan. 11, 2022

(54) INVERTIBLE LENS AND METHOD OF DESIGN

(71) Applicant: Johnson & Johnson Vision Care, Inc., Jacksonville, FL (US)

(72) Inventors: Philippe F. Jubin, Fernandina Beach, FL (US); Robert Ryan Valdomar, Jacksonville, FL (US); Shahrokh Shawn Zeinali, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 185 days.

(21) Appl. No.: 16/369,378

(22) Filed: Mar. 29, 2019

(65) Prior Publication Data

US 2020/0310162 A1 Oct. 1, 2020

(51) Int. Cl.
*G02C 7/04* (2006.01)
*G02C 7/02* (2006.01)

(52) U.S. Cl.
CPC ............. *G02C 7/049* (2013.01); *G02C 7/028* (2013.01)

(58) Field of Classification Search
CPC .......... G02C 7/049; G02C 7/04; G02C 7/028; G02C 7/024
USPC ...................................................... 351/159.02
See application file for complete search history.

(56) References Cited

U.S. PATENT DOCUMENTS

| 5,210,553 | A  | * | 5/1993  | Barth     | G02C 7/061 |
|-----------|----|---|---------|-----------|------------|
|           |    |   |         |           | 351/159.42 |
| 6,789,896 | B2 | * | 9/2004  | Morris    | G02C 7/02  |
|           |    |   |         |           | 351/159.01 |
| 7,036,931 | B2 | * | 5/2006  | Lindacher | A61F 2/1613 |
|           |    |   |         |           | 351/159.41 |
| 8,020,995 | B2 | * | 9/2011  | Norrby    | G02C 7/028 |
|           |    |   |         |           | 351/212    |
| 8,556,426 | B2 | * | 10/2013 | Norrby    | A61B 3/107 |
|           |    |   |         |           | 351/212    |
| 8,998,415 | B2 | * | 4/2015  | Norrby    | G02C 7/028 |
|           |    |   |         |           | 351/212    |
| 9,504,377 | B2 | * | 11/2016 | Norrby    | A61B 3/1035 |
| 10,830,666| B2 | * | 11/2020 | Unterkofler | G01M 11/0278 |
| 2003/0086055 | A1 | * | 5/2003 | Morris   | G02C 7/02  |
|           |    |   |         |           | 351/159.01 |
| 2004/0061828 | A1 |   | 4/2004 | Newman    |            |

(Continued)

FOREIGN PATENT DOCUMENTS

EP 136424 B1 10/1989

OTHER PUBLICATIONS

How Modulus Affects Soft Contact Lenses. Article [online]. Ghormley. 2005 [retrieved on Jun. 25, 2020]. Retrieved from the internet: <URL:hltps:/lwww.clspectrum.com/issues/2005/november-2005/how-modulus-alfects-solt-contact-lenses>.

*Primary Examiner* — William R Alexander

(57) ABSTRACT

An ophthalmic lens may comprises a main body comprising a first surface and a second surface opposite the first surface, the main body having a diameter, a base curve, a peripheral thickness, and a center thickness, wherein, one or more of the diameter, the base curve, the peripheral thickness, or the center thickness are configured such that a dsag is less than 1.3% when comparing a first orientation of the main body with at least a portion of the first surface abutting an eye of a wearer and a second orientation of the main body with at least a portion of the second surface abutting the eye of the wearer.

30 Claims, 20 Drawing Sheets

(56) References Cited

U.S. PATENT DOCUMENTS

| | | |
|---|---|---|
| 2004/0156013 A1* | 8/2004 | Lindacher .............. G02C 7/048 351/159.41 |
| 2007/0216859 A1 | 9/2007 | Caroline et al. |
| 2015/0094393 A1 | 4/2015 | Holland et al. |
| 2018/0120199 A1* | 5/2018 | Unterkofler .......... G01M 11/081 |

* cited by examiner

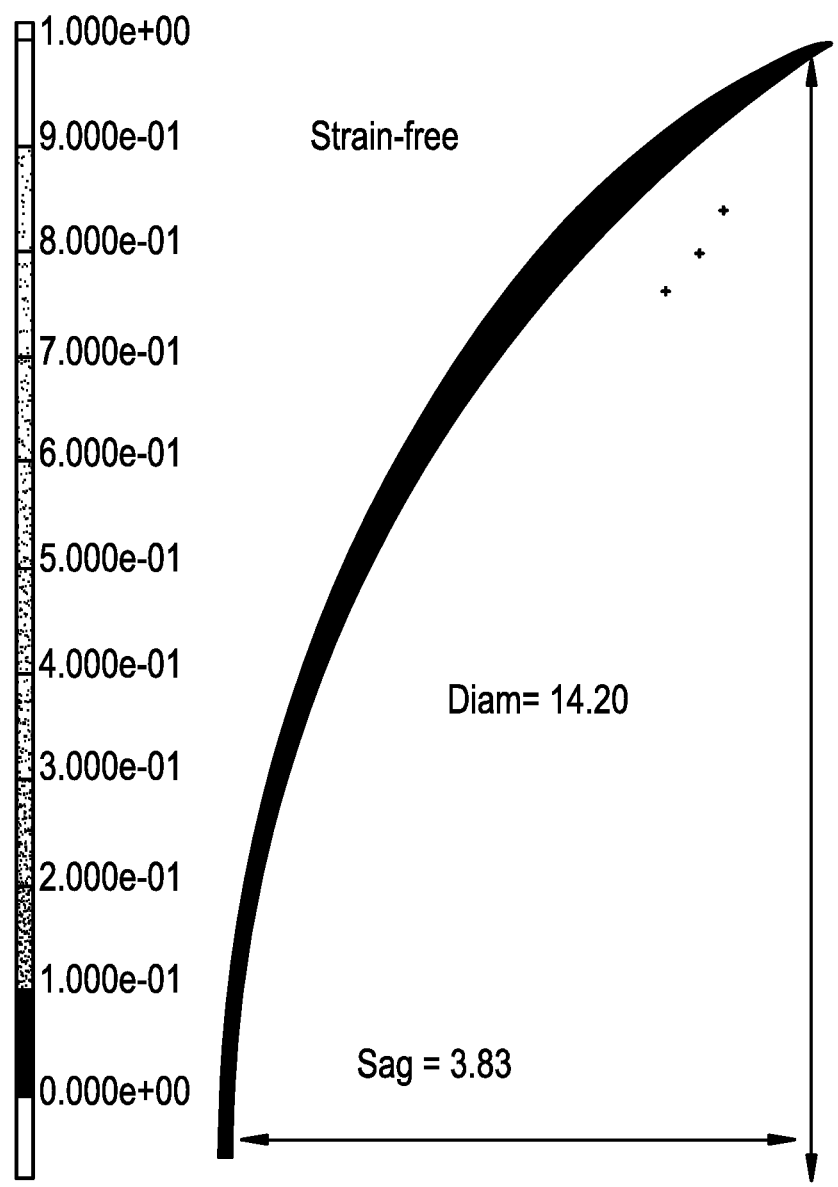

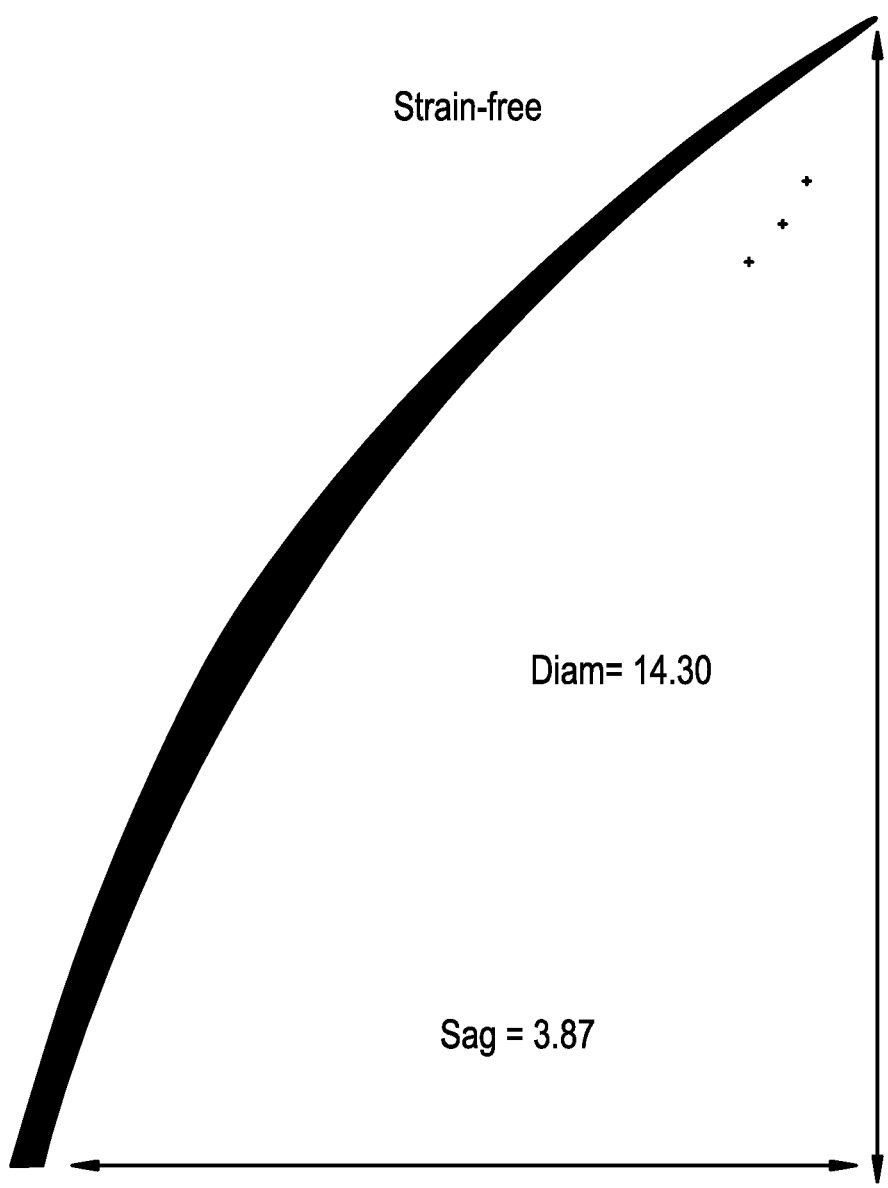

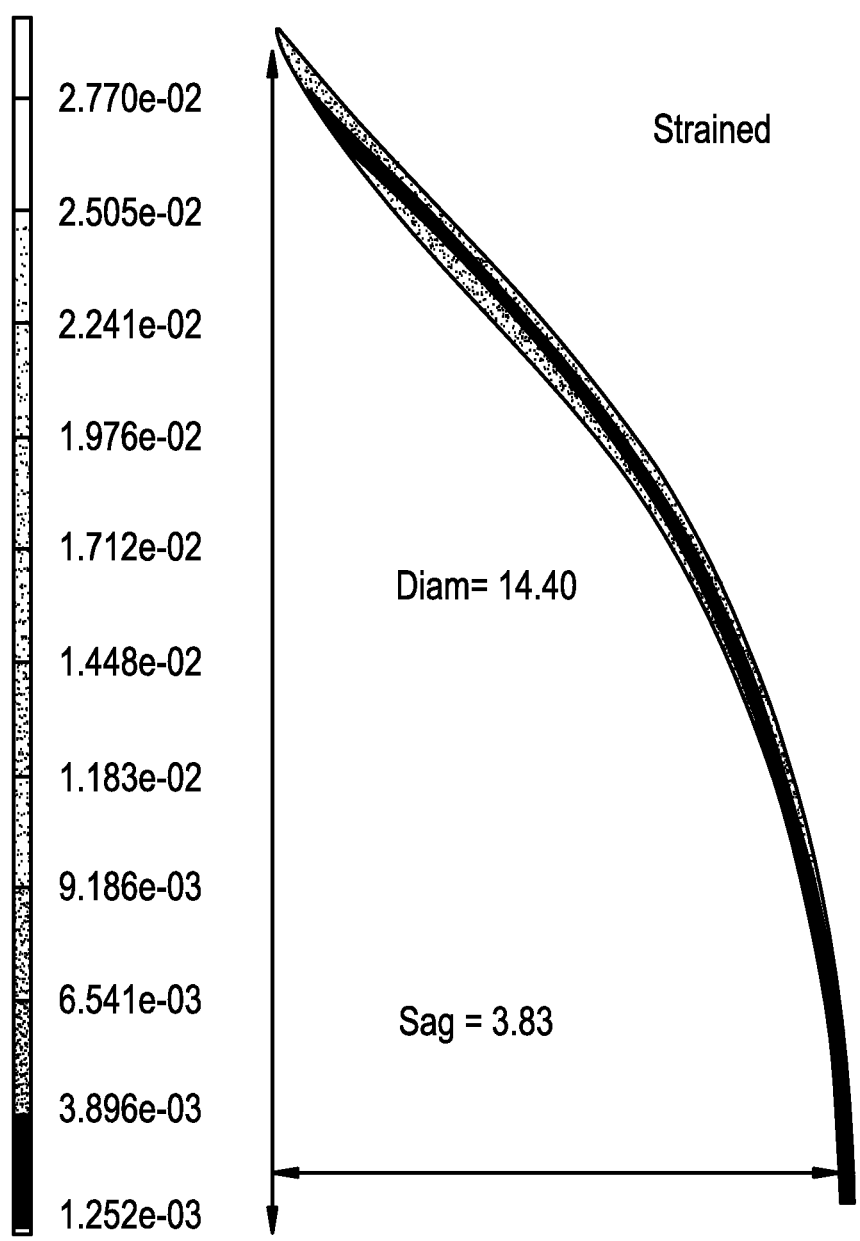

FIG. 4A

| | 3180-84-01 | 3180-84-03 | 3180-84-04 | 3180-84-05 | 3180-84-06 |
|---|---|---|---|---|---|
| RRV | | | | | |
| Ease of Telling I/O | 4 | 2 | 2 | 2 | 1 |
| Ease of Handling | 3 | 3 | 1 | 2 | 3 |
| RS | 3180-84-01 | 3180-84-03 | 3180-84-04 | 3180-84-05 | 3180-84-06 |
| Ease of Telling I/O | 4 | 2 | 1 | 2 | 3 |
| Ease of Handling | 3 | 3 | 2 | 3 | 4 |
| BDS | 3180-84-01 | 3180-84-03 | 3180-84-04 | 3180-84-05 | 3180-84-06 |
| Ease of Telling I/O | 3 | 1 | 1 | 2 | 2 |
| Ease of Handling | 2 | 2 | 1 | 2 | 2 |
| ALR | 3180-84-01 | 3180-84-03 | 3180-84-04 | 3180-84-05 | 3180-84-06 |
| Ease of Telling I/O | 4 | 3 | 1 | 1 | 3 |
| Ease of Handling | 4 | 4 | 2 | 3 | 3 |
| PYG | 3180-84-01 | 3180-84-03 | 3180-84-04 | 3180-84-05 | 3180-84-06 |
| Ease of Telling I/O | 4 | 3 | 1 | 1 | 1 |
| Ease of Handling | 4 | 3 | 1 | 3 | 3 |
| MC | 3180-84-01 | 3180-84-03 | 3180-84-04 | 3180-84-05 | 3180-84-06 |
| Ease of Telling I/O | 1 | 3 | 2 | 2 | 3 |
| Ease of Handling | 2 | 3 | 1 | 1 | 3 |

FIG. 4B

| | GAR | 3180-84-01 | 3180-84-03 | 3180-84-04 | 3180-84-05 | 3180-84-06 |
|---|---|---|---|---|---|---|
| | Ease of Telling I/O | 3 | 1 | 1 | 1 | 3 |
| | Ease of Handling | 2 | 2 | 3 | 3 | 2 |
| | GH | 3180-84-01 | 3180-84-03 | 3180-84-04 | 3180-84-05 | 3180-84-06 |
| | Ease of Telling I/O | 4 | 1 | 1 | 2 | 1 |
| | Ease of Handling | 4 | 3 | 3 | 3 | 3 |
| | XW | 3180-84-01 | 3180-84-03 | 3180-84-04 | 3180-84-05 | 3180-84-06 |
| | Ease of Telling I/O | 2 | 3 | 2 | 3 | 1 |
| | Ease of Handling | 4 | 4 | 2 | 3 | 3 |
| | YL | 3180-84-01 | 3180-84-03 | 3180-84-04 | 3180-84-05 | 3180-84-06 |
| | Ease of Telling I/O | 4 | 4 | 1 | 4 | 4 |
| | Ease of Handling | 4 | 1 | 4 | 4 | 4 |
| | TM | 3180-84-01 | 3180-84-03 | 3180-84-04 | 3180-84-05 | 3180-84-06 |
| | Ease of Telling I/O | 4 | 3 | 1 | 2 | 2 |
| | Ease of Handling | 3 | 3 | 1 | 2 | 2 |
| | SP | 3180-84-01 | 3180-84-03 | 3180-84-04 | 3180-84-05 | 3180-84-06 |
| | Ease of Telling I/O | 4 | 2 | 1 | 3 | 4 |
| | Ease of Handling | 3 | 1 | 3 | 3 | 3 |
| | VK | 3180-84-01 | 3180-84-03 | 3180-84-04 | 3180-84-05 | 3180-84-06 |
| | Ease of Telling I/O | 4 | 1 | 1 | 1 | 1 |
| | Ease of Handling | 3 | 3 | 1 | 3 | 3 |

LD-USZ231+0000 - no Wrap

LD-USZ231+0000 - no Wrap

LD-USZ231+0000 - Wrapped

LD-USZ231+0000 - Wrapped

LD-USZ231-0400 - no Wrap

— Primary
-- Inverted

LD-USZ231-0400 - no Wrap

— Primary
-- Inverted

LD-USZ231-0400 - Wrapped

— Primary
-- Inverted

LD-USZ231-0400 - Wrapped

— Primary
-- Inverted

LD-USZ231+0400 - no Wrap

— Primary
-- Inverted

LD-USZ231+0400 - no Wrap

— Primary
-- Inverted

LD-USZ231+0400 - Wrapped

LD-USZ231+0400 - Wrapped

INVERTIBLE LENS AND METHOD OF DESIGN

BACKGROUND OF THE DISCLOSURE

1. Field of the Disclosure

The present disclosure relates to ophthalmic devices, such as wearable lenses, including soft contact lenses, and more particularly, to invertible ophthalmic devices and methods for designing invertible ophthalmic devices.

2. Discussion of the Related Art

Current contact lens designs are intended to fit in one orientation, and hence, the disparity between primary (e.g., having a defined inside surface for contact with the eye) and inside-out orientations is maximized to prevent confusion between correct and incorrect orientation during insertion/placement onto the eye. Therefore, the lens fit, vision, and comfort are negatively impacted when the lens is inserted inside-out.

EP1364248B1 describes a soft contact lens for fitting to an eye of a wearer in either a right way out orientation or in an inside out orientation, wherein in said right way out orientation there is provided an anterior convex surface and a posterior concave surface and in said inside out orientation said right way out anterior convex surface is converted to a posterior concave surface and said right way out posterior concave surface is converted to a convex anterior surface. In accordance with EP1364248B1, said conversion is effected by flexing of the lens, wherein said lens flexure is accommodated by at least one formation resulting in an adjustment to a surface contour of either of said first and second surfaces. According to EP1364248B1, the natural resistance to being "inside out" and the abstract and uncontrolled curvature changes that occur as a result may be reduced or eliminated by the relieving areas placed within the lens.

However, improvements are needed.

SUMMARY OF THE DISCLOSURE

The present disclosure relates to invertible ophthalmic lenses and methods for designing and optimizing the same, for example, by in-silico performance analysis and prototyping. As an example, the peripheral region of the lens can be designed in such a way that the disparity in base curve and diameter between the primary and the inside-out orientations is minimized. The impact of peripheral thickness on this disparity, depends on lens diameter, base curve, and center thickness which have to be optimized along with the peripheral thickness for the best performance. When the lens base curve and diameter are comparable between the primary and the inside-out orientations, the on-eye fit and vision performance are expected to be comparable.

Lens base curve and diameter may be identified as determining factors of inverted fit. In accordance with the present disclosure, one or more of the base curve and diameter of a lens may be configured between primary and inside-out orientations. Hence, the peripheral region of the lens may be designed in such a way that deviation in diameter or sag (dDiam or dSag) between primary and inside-out orientation is minimized. Moreover, the impact of peripheral thickness may depend on lens diameter, base curve, and center thickness. One or more of lens diameter, base curve, and center thickness may be optimized for best performance.

Printing on a lens design that can be inverted may provide an interchangeable (e.g., reversible) cosmetic appearance on eye. This effect may comprise a change in one or more of a color, a pattern, or an effect. The resulting interchangeable cosmetic appearance may be customized based on print order, design/pattern, colors, pattern alignment, and opacity levels, etc.

An ophthalmic lens may comprises a main body comprising a first surface and a second surface opposite the first surface, the main body having a diameter, a base curve, a peripheral thickness, and a center thickness, wherein, one or more of the diameter, the base curve, the peripheral thickness, or the center thickness are configured such that a dsag is less than 1.3% when comparing a first orientation of the main body with at least a portion of the first surface abutting an eye of a wearer and a second orientation of the main body with at least a portion of the second surface abutting the eye of the wearer.

An ophthalmic lens may comprise a main body comprising a first surface and a second surface opposite the first surface, the main body having a diameter, a base curve, a thickness profile, and an edge profile, wherein, the edge profile and one or more of the diameter, the base curve, or the thickness profile are configured such that an apex height measured from an edge apex to a nearest surface of the eye is less than or equal to 0.020 mm when the lens is in an inverted orientation with at least a portion of the second surface abutting the eye of the wearer.

Methods for making ophthalmic lenses are disclosed.

BRIEF DESCRIPTION OF THE DRAWINGS

The foregoing and other features and advantages of the disclosure will be apparent from the following, more particular description of preferred embodiments of the disclosure, as illustrated in the accompanying drawings.

FIGS. 2A-2B illustrate strain modelling of a conventional soft contact lens in a primary orientation (FIG. 2A) and inverted or inside-out orientation (FIG. 2B).

FIGS. 3A-3B illustrate strain modelling of a soft contact lens in accordance with the present disclosure (e.g., with optimized peripheral thickness), where the lens is in a primary orientation (FIG. 3A) and inverted or inside-out orientation (FIG. 3B).

FIGS. 4A and 4B show a listing of the ratings of a survey of 14 subjects.

DETAILED DESCRIPTION

Figure 1A:
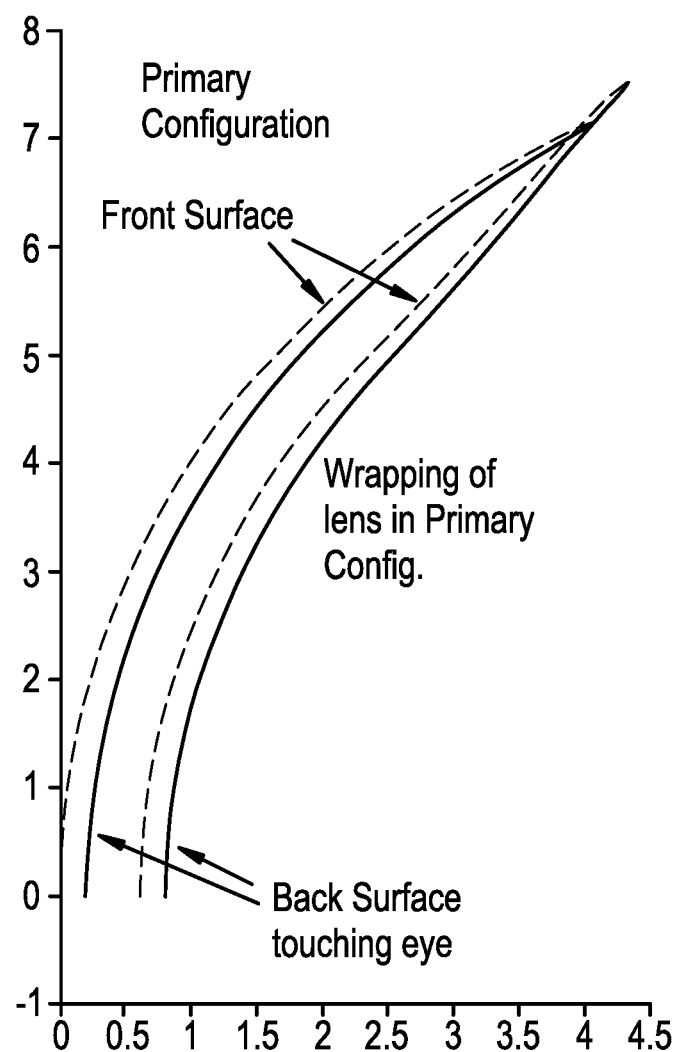
FIG. 1A is a schematic illustration of a soft contact lens in a primary orientation as well as its wrapped configuration.
Figure 1B:
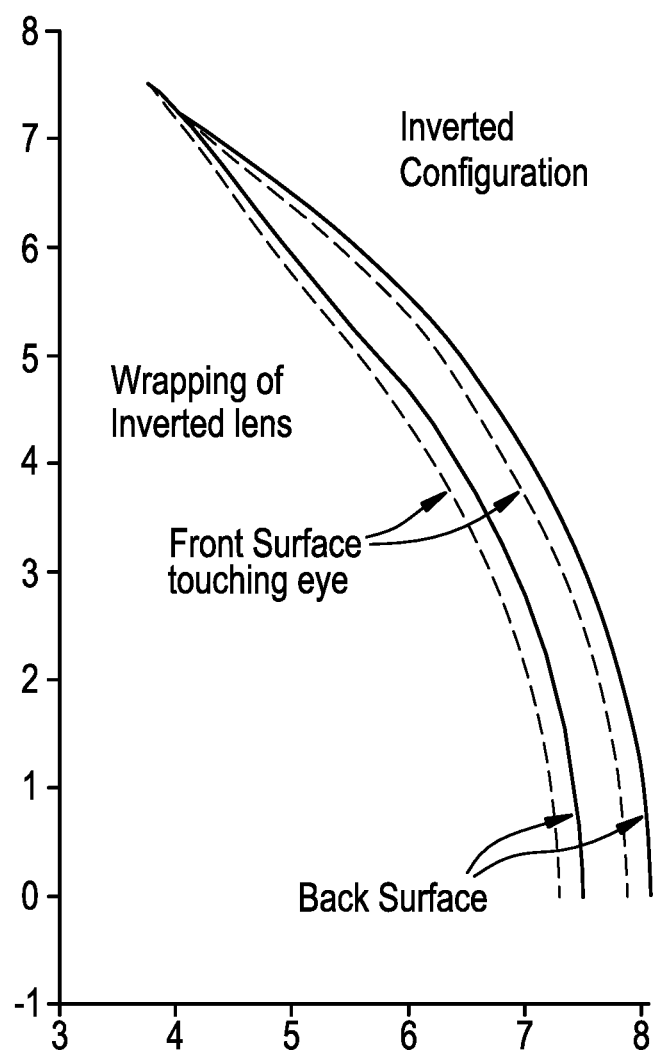
FIG. 1B is a schematic illustration of an inverted soft contact lens (e.g., inside-out) as well as its wrapped configuration.

A soft contact lens may be designed with a base curve (or curves) which is/are configured to fit the lens to the corneal/scleral profile of an eye of a wearer, a diameter which is generally larger than the corneal diameter and an anterior curve (or curves) which provides for the refracting function of the lens. Since a soft contact lens, by function, may be made from a flexible material, the soft contact lens may conform to the corneal/scleral profile and 'wrap' onto the eye (FIG. 1A). This wrapping or deforming from the lens's inverted state can have a noticeable refractive influence on the eye as the curves of the contact lens change in order to accommodate the profiles of the cornea and sclera. As the lens is inverted, the front surface becomes the back surface which will be touching the eye surface when the inverted lens wraps on the eye (FIG. 1B). Moreover, the effect of wrapping on the refractive power of the lens may also be dependent on whether the lens is applied on the eye in a primary orientation or an inverted/inside-out orientation.

Figure 2B:
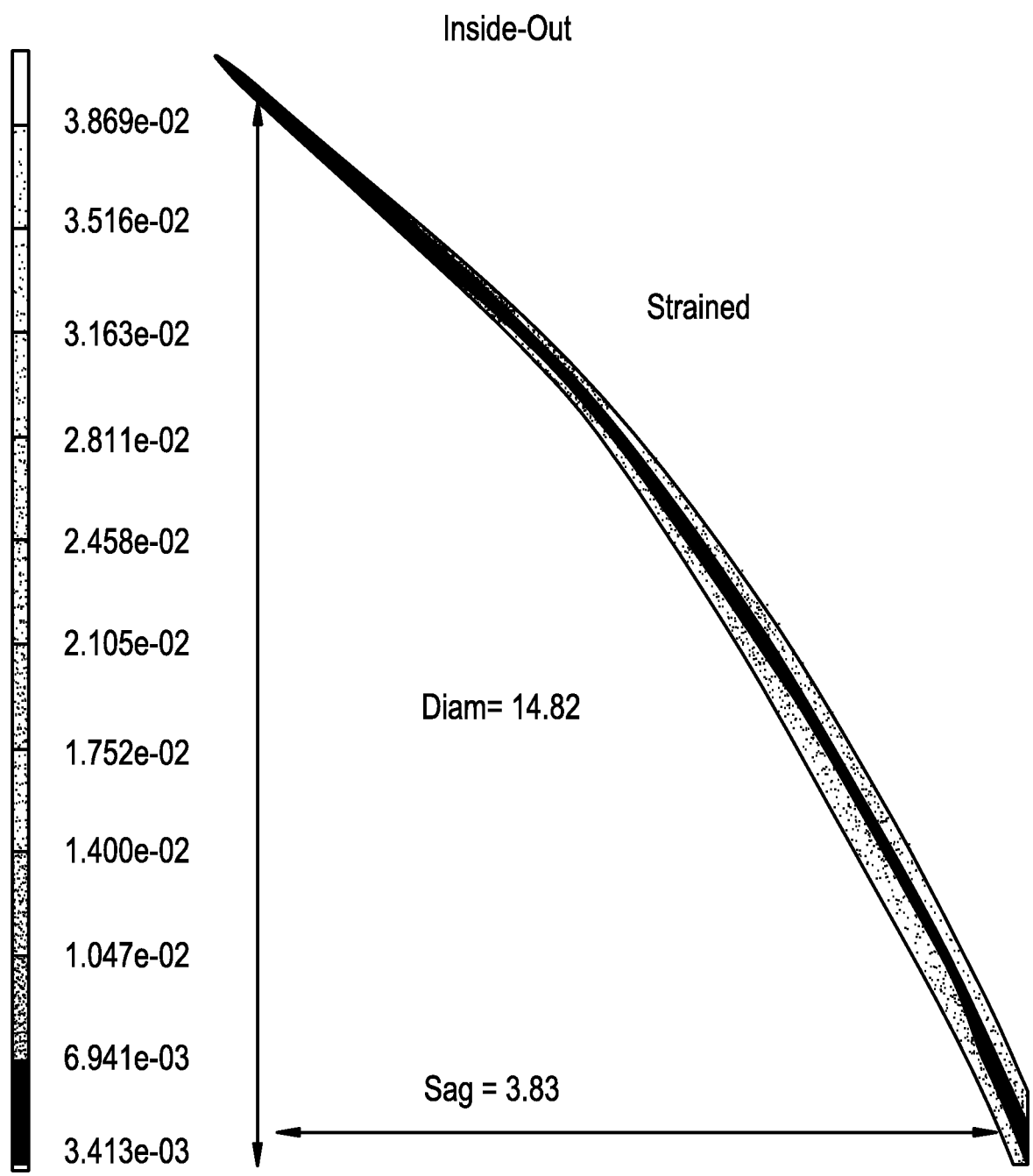

In accordance with the present disclosure, behavior of a lens in various orientations may be modeled (e.g., using Finite Element Analysis (FEA), using MSC Marc software, etc.) to simulate lens inversion, lens wrapping on eye, and lens handling e.g., placement of the lens on eye using a finger or implement. For example, FIGS. 2A-2B illustrate strain modelling of a conventional soft contact lens in a primary orientation which is assumed to be strain-free (FIG. 2A) and inverted or inside-out orientation with residual strain after forcing the lens to buckle (FIG. 2B). When a lens with standard design is inverted, the thickness in the periphery resists the deformation and there will be residual strain in the lens in the inverted configuration. That corresponds to lens edge flaring out, and hence, increased diameter (reduced sag) and ultimately, when put on an eye, different fitting characteristics on eye. In fact, according to current practices by soft contact lens users, the larger the disparity between primary and inverted configuration, the easier to recognize if the lens is inside-out by visual inspection. FIGS. 3A-3B illustrate strain modelling of a soft contact lens in accordance with the present disclosure (e.g., with reduced peripheral thickness), where the lens is in a primary orientation (FIG. 3A) and inverted or inside-out orientation (FIG. 3B). By managing (e.g., eliminating, minimizing, etc.) the peripheral thickness, major resistance to lens inversion is reduced, and hence, lens diameter and sag will be closer to the originally intended values in the primary configuration (before inversion), i.e., deviation in diameter or sag (dDiam or dSag) between primary and inside-out orientation is minimized.

A potential downside of reducing the peripheral thickness is increased difficulty in lens handling (e.g. flimsiness and folding). Several design alternatives in accordance with the present disclosure were generated and manufactured for assessment. In an aspect, a survey of fourteen (14) subjects was conducted based on two metrics/questions: 1) rate the ease of telling a lens is inside-out and 2) rate the ease of handling the lens for each lens of five (5) sample lenses. The five lenses include a control lens and four (4) test lenses of different variants of the proposed design, each having a prescribed diameter (D), based curve (BC), and center thickness (CT) in millimeters (mm):

Control: D14.2, BC8.5, CT0.085
Design 403: D14.3, BC8.1, CT0.1
Design 404: D14.3, BC8.1, CT0.2
Design 405: D14.3, BC8.3, CT0.1
Design 406: D14.3, BC8.5, CT0.1

FIGS. 4A and 4B show a listing of the ratings of the survey of fourteen (14) subjects, where the ratings are as follows:

1=very difficult
2=somewhat difficult
3=somewhat easy
4=very easy

Table 1 illustrates averages scores from the survey for telling I/O and handling.

TABLE 1

|  | Control D14.2, BC8.5, CT0.085 | Design 403 D14.3, BC8.1, CT0.1 | Design 404 D14.3, BC8.1, CT0.2 | Design 405 D14.3, BC8.3, CT0.1 | Design 406 D14.3, BC8.5, CT0.1 |
|---|---|---|---|---|---|
| Ave. Ease of Telling I/O Score | 3.50 | 2.14 | 1.21 | 2.07 | 2.29 |
| Ave. Ease of Handling Score | 3.07 | 2.79 | 2.07 | 2.71 | 2.79 |

Figure 5:
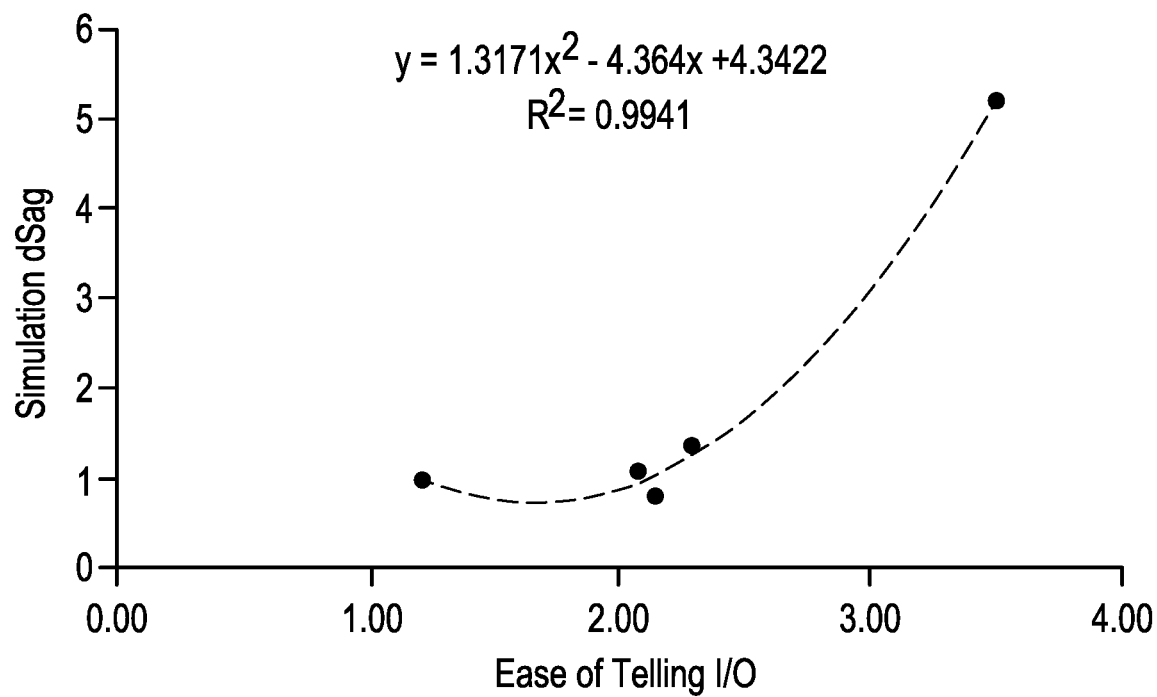
FIG. 5 shows a plot illustrating a relationship between a simulated dsag and the survey score for ease of telling a lens is inside-out.

According to Table 1 and subjective feedback, Design 405 appear to behave optimally from both aspects; easy to handle and at the same time more difficult to tell if it is inside-out. FIG. 5 shows a plot illustrating a relationship between a simulated dsag (deviation in sag after inversion) and the survey score for ease of telling whether a lens is inside-out. This plot shows that simulation dsag can be used as a predictor of telling I/O scores.

To further investigate the range of applicable design parameters, Design 405 was selected as an optimal design, and a range of variation for Diameter and Base Curve and Center Thickness were proposed for further evaluation, as shown in Table 2.

TABLE 2

| Diam | 13.8 | 14 | 14.3 | 14.5 | 14.8 |
|---|---|---|---|---|---|
| BC | 8 | 8.1 | 8.3 | 8.5 | 8.6 |
| CT | 60 | 80 | 100 | 150 | 200 |

Figure 6:
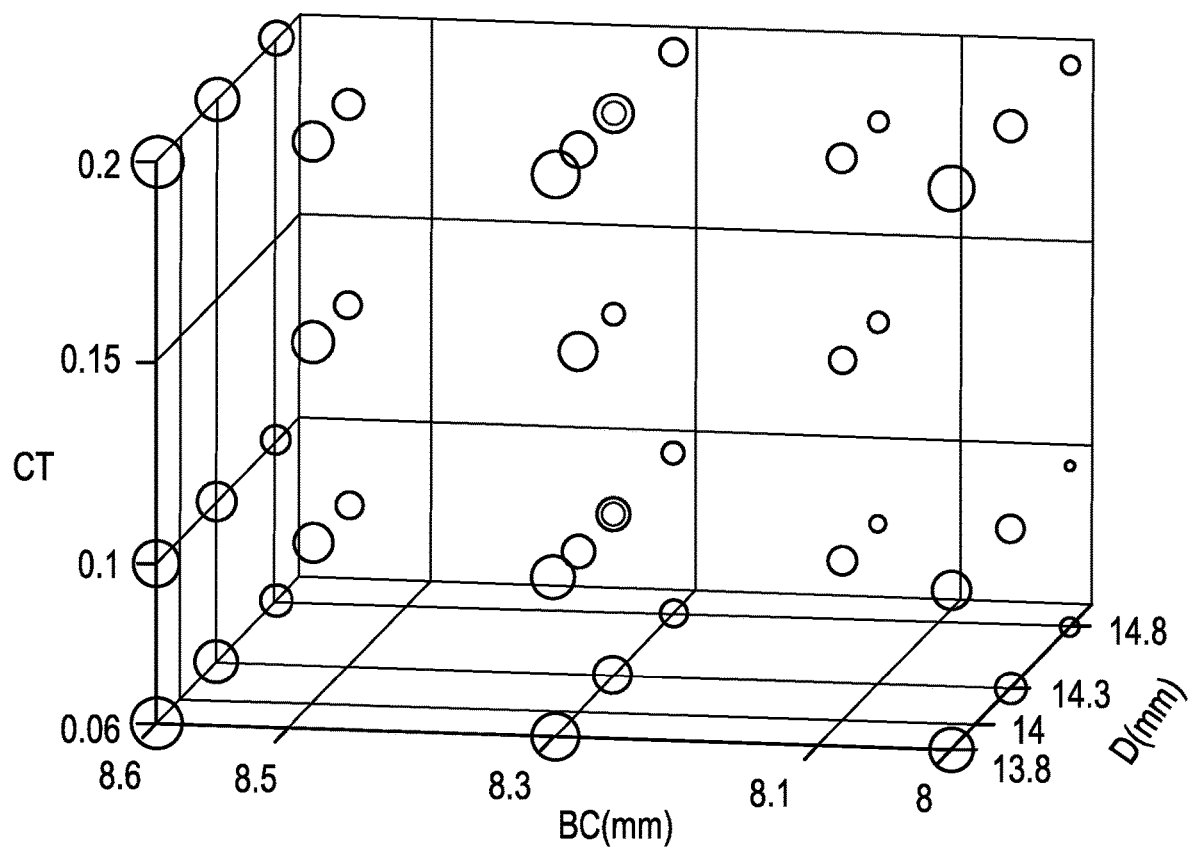
FIG. 6 illustrates a plot that shows the resulting design space of Diameter, Base Curve, and CT and their impact on the simulation metric dSag illustrated with the size of markers (e.g., diameter of the circle marker).

Within the above parameter ranges (represented by Table 2), 27 more design combinations are generated and evaluated for inversion simulation in addition to the original 18 designs, a total of 45 design variations. FIG. 6 illustrates a plot that shows the resulting design space for Diameter, Base Curve, and CT and their impact on the simulation metric dSag illustrated with the size of markers (e.g., diameter of the circle marker). The smaller the dSag, the more difficult to tell I/O, and the better the performance.

Based on the data in Table 1 and the relationship between simulation metric dSag and ease of Telling I/O (FIG. 5) the limits for Preferred dSag and Acceptable dSag may be estimated as:

Ease of Telling I/O<1.2% is Preferred <==>dSag <1% is Preferred

Ease of Telling I/O<2% is Acceptable <==>dSag <1.3% is Acceptable

Terms such as preferred and acceptable are used herein to differentiate exemplary levels of performance and are not intended to indicate preferred or best embodiments. Other performance ranges may be used. With these limits for simulation metric dSag, we can identify the Preferred (Table 3) and Acceptable (Table 4) designs out of forty-five (45) designs that are within the range given in Table 2:

TABLE 3

| | Preferred Designs: | | | | |
|---|---|---|---|---|---|
| | 1 | 2 | 3 | 4 | 5 |
| Diam | 14.3 | 14.3 | 14.8 | 14.8 | 14.8 |
| BC | 8.1 | 8.1 | 8 | 8 | 8 |
| CT | 0.1 | 0.2 | 0.1 | 0.2 | 0.06 |
| dSag | 0.8053 | 0.9887 | 0.6533 | 0.902 | 0.8871 |

TABLE 4

| | Acceptable Designs: | | | | | | |
|---|---|---|---|---|---|---|---|
| | 1 | 2 | 3 | 4 | 5 | 6 | 7 |
| Diam | 14.3 | 14.3 | 14.3 | 14.3 | 14.3 | 14.3 | 14 |
| BC | 8.3 | 8.3 | 8.3 | 8.1 | 8.1 | 8.1 | 8.1 |
| CT | 0.1 | 0.15 | 0.2 | 0.1 | 0.15 | 0.2 | 0.15 |
| dSag | 1.0737 | 1.0683 | 1.2572 | 0.8053 | 1.0593 | 0.9887 | 1.2695 |

| | Acceptable Designs: | | | | |
|---|---|---|---|---|---|
| | 8 | 9 | 10 | 11 | 12 |
| Diam | 14.8 | 14.8 | 14.8 | 14.8 | 14.8 |
| BC | 8 | 8.3 | 8 | 8 | 8.3 |
| CT | 0.1 | 0.1 | 0.2 | 0.06 | 0.06 |
| dSag | 0.6533 | 1.0203 | 0.902 | 0.8871 | 1.2798 |

Material properties (e.g., Modulus of Elasticity as measured using ANSI Z80.20) could have an impact on mechanical behavior of the lens. To investigate the impact of material property the modulus is altered between 150 kpa to 660 kpa. Inversion and handling simulations were repeated to evaluate a metric for handling and telling inside-out inversion (I/O), and results are shown in Table 5:

TABLE 5

| Modulus (kPa) | I/O Metric = dSag | Handling Metric = Sag on Finger |
|---|---|---|
| 150 | 0.043 | 1.4 |
| 270 | 0.043 | 2.62 |

TABLE 5-continued

| Modulus (kPa) | I/O Metric = dSag | Handling Metric = Sag on Finger |
|---|---|---|
| 420 | 0.043 | 3.306 |
| 660 | 0.043 | 3.788 |

Data in Table 5 shows increasing modulus may improve handling of the reversible lens without impacting the reversed shape of the lens which is a desirable outcome.

Figure 7:
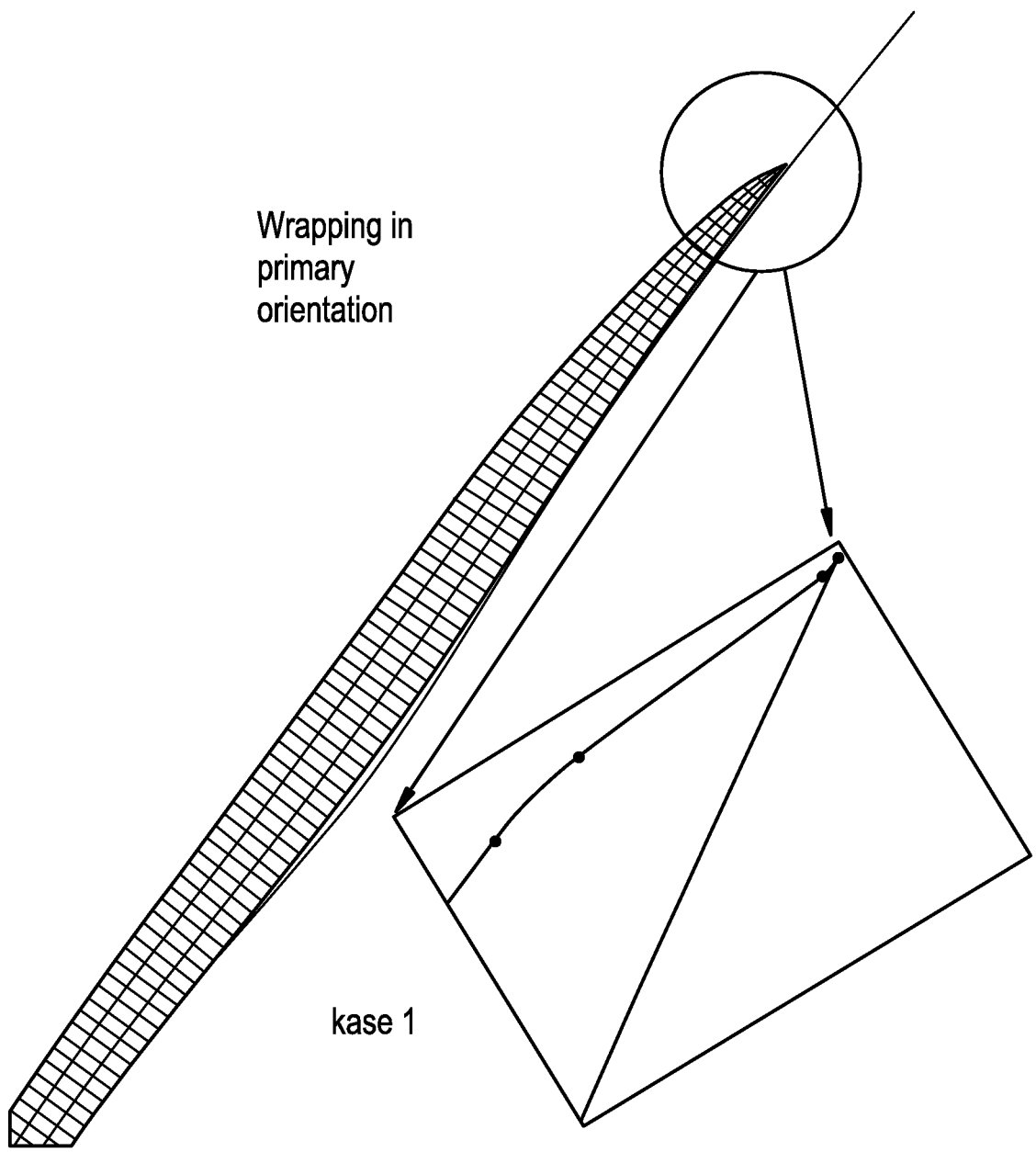
FIG. 7 shows a model of a peripheral edge of a conventional contact lens wrapping in a primary orientation.
Figure 8:
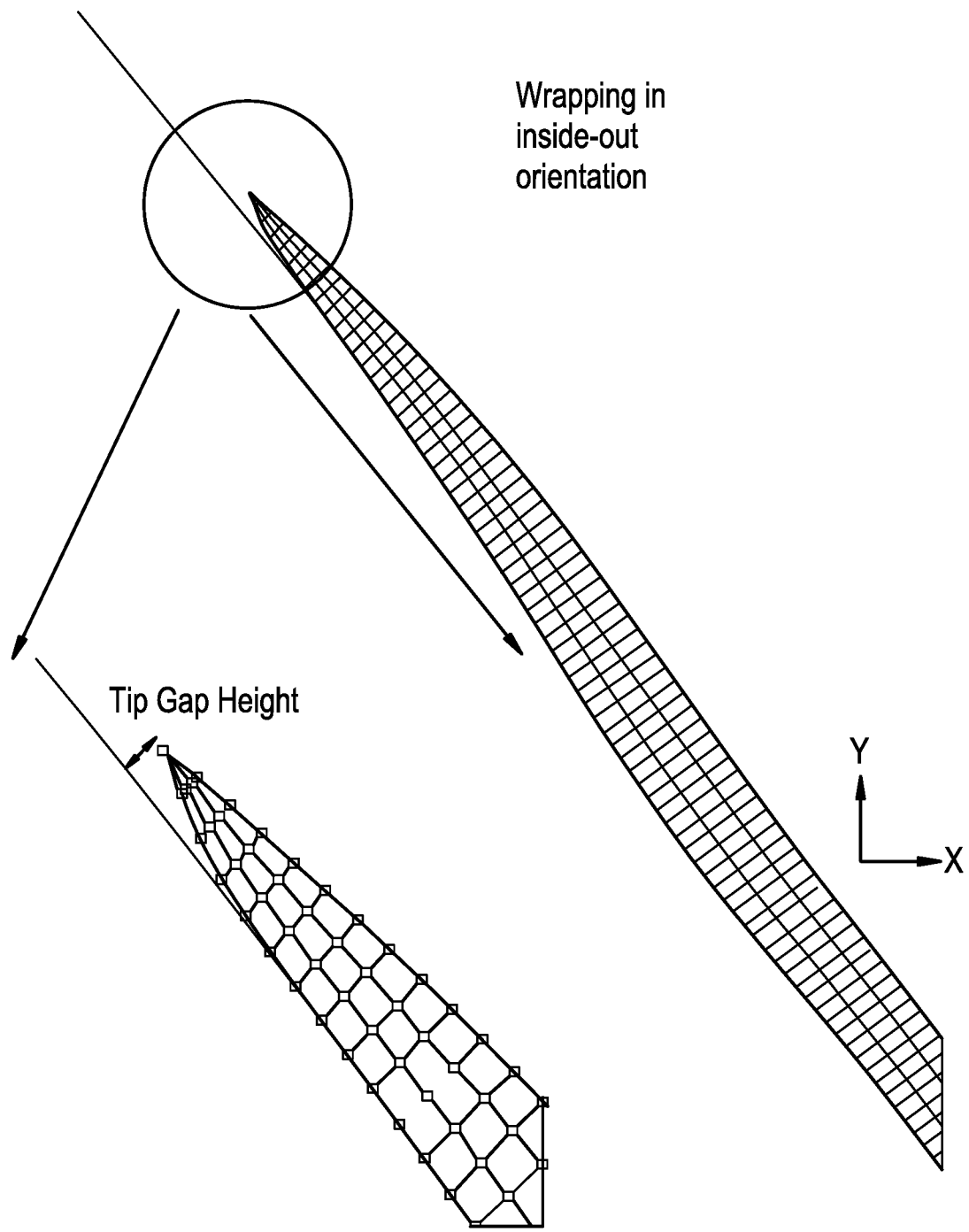
FIG. 8 shows a model of a peripheral edge of the conventional contact lens wrapping in an inverted or inside-out orientation.

In a contact lens the peripheral edge of the lens may affect overall comfort. For example, FIG. 7 shows a model of a peripheral edge of a conventional contact lens wrapping in a primary orientation. As shown, the edge wraps in such a way that is typically comfortable to a wearer as the lens edge is fully in touch with the eye. For comparison, FIG. 8 shows a model of a peripheral edge of the conventional contact lens wrapping in an inverted or inside-out orientation. As shown, the peripheral edge wraps in a different manner relative to the eye of the wearer and there is a gap between the edge apex and the eye surface which may be uncomfortable to the wearer as the eyelid repeatedly travels from the eye surface to the contact lens during blinking.

Figure 9:
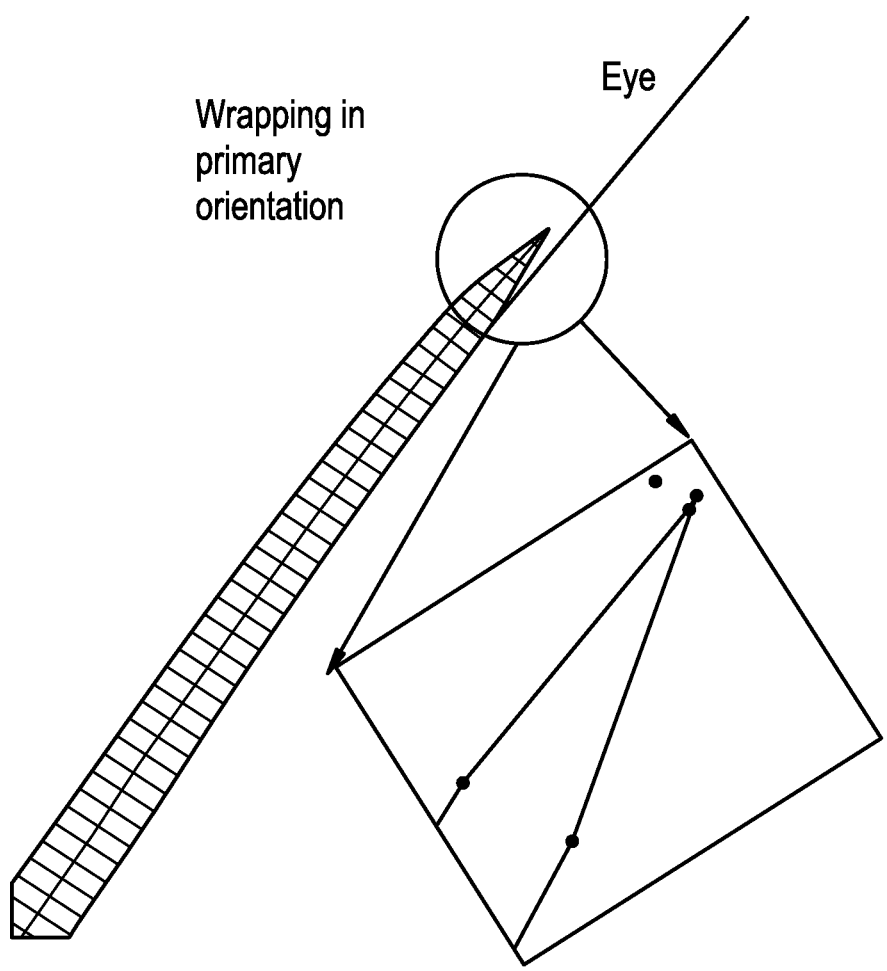
FIG. 9 shows a model of a peripheral edge of a contact lens in accordance with the present disclosure wrapping in a primary orientation.
Figure 10:
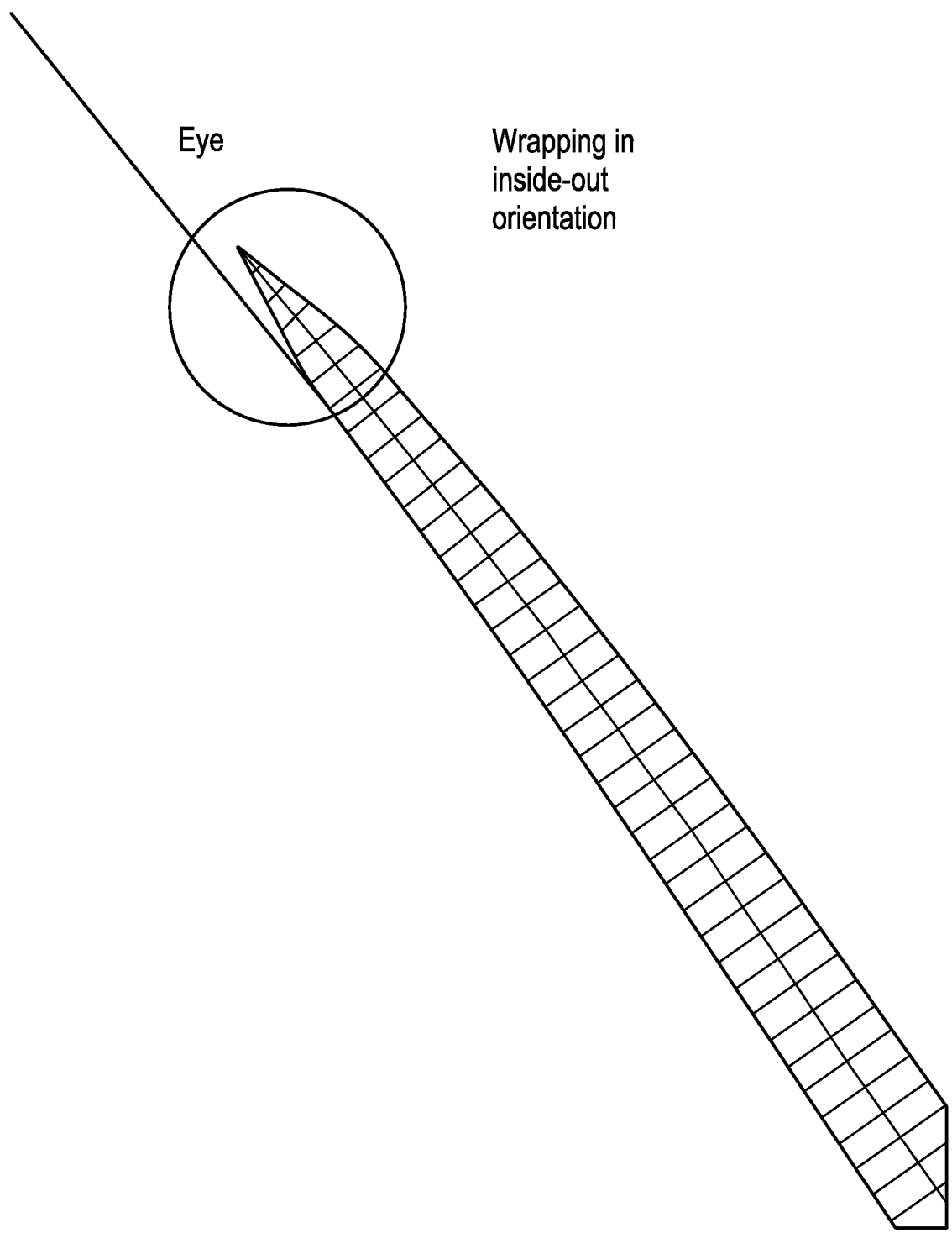
FIG. 10 shows a model of a peripheral edge of the contact lens in accordance with the present disclosure wrapping in an inverted or inside-out orientation.

However, in accordance with the present disclosure, with an edge profile that is symmetric or substantially similar with respect to both sides of the lens, the differences in comfort on eye between the two orientations may be minimized. Additionally or alternatively, the existing gap (i.e. apex height) between the edge apex and the eye surface may be reduced in either orientation. For example, FIG. 9 shows a model of a peripheral edge of a contact lens in accordance with the present disclosure wrapping in a primary orientation. For comparison, FIG. 10 shows a model of a peripheral edge of the contact lens in accordance with the present disclosure wrapping in an inverted or inside-out orientation.

Figure 11A:
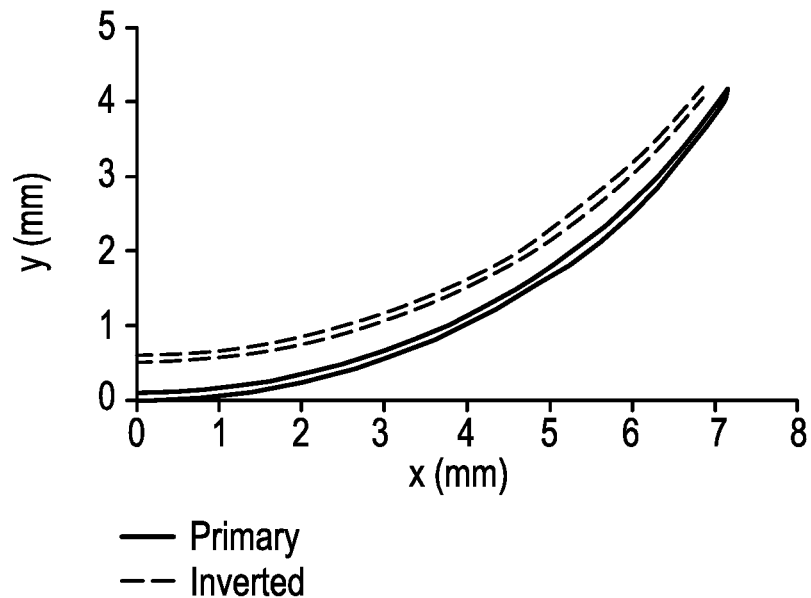
FIGS. 11A-11D illustrate plots based on optical analysis of a 0.00 D lens in both primary and inverted or inside-out orientations.
Figure 11B:
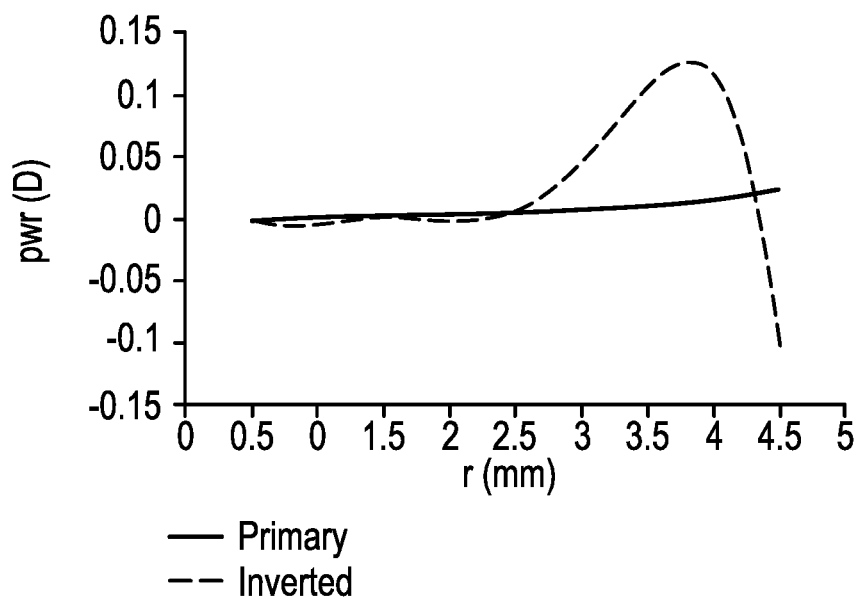
Figure 11C:
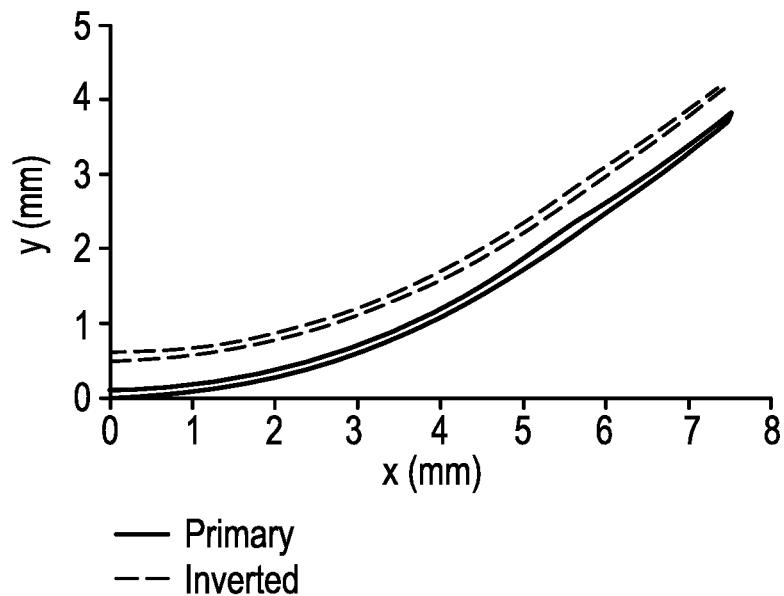
Figure 11D:
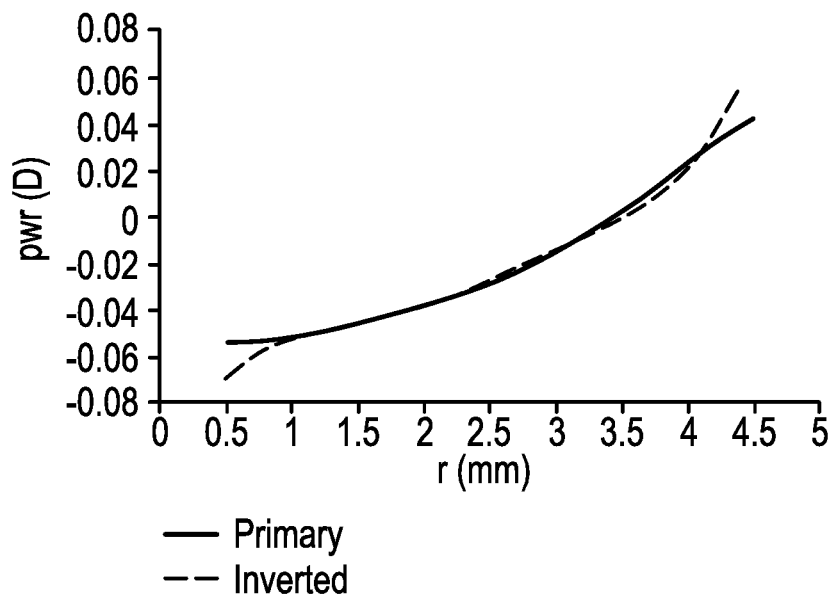

As an ophthalmic medical device that provides vision correction, an invertible soft contact lens needs to provide equivalent power correction using either orientation. Given the incompressible nature of the soft contact lens material and the fact that lens wraps on the eye when put on eye with either side, one may speculate that the optical region of contact lens would deform to a similar curvature or shape on eye when put on either orientation. A preliminary opto-mechanical simulation is performed with a lens design in accordance with the present disclosure with both primary and inverted orientations. Analysis is repeated for designs with different powers (−4.00 D, 0.00 D, +4.00 D). Optical analysis is done assuming both unwrapped lens geometry and wrapped lens geometry (estimated through FEA). FIGS. 11A-11D illustrate plots based on optical analysis of a 0.00 D lens in both primary and inverted or inside-out orientations. The plots shown in FIGS. 11A-11D compare the lens profiles and their calculated optical power profiles. They show there is minimal differences in lens power (within optical region where r<4 mm) between the primary and inside-out orientations (FIGS. 11A-11B). Particularly when the lenses wrap on eye, the differences between the power profiles vanishes (FIGS. 11C-11D), as the geometries become equivalent.

Figure 12A:
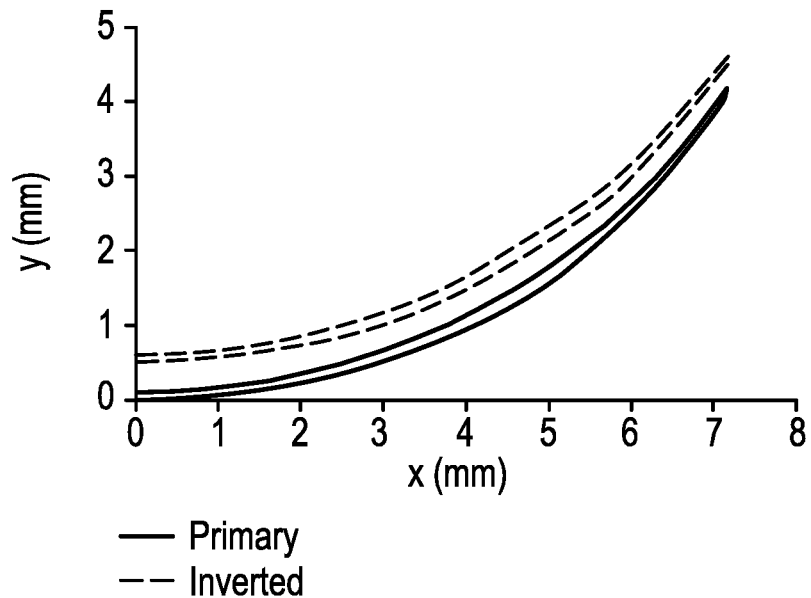
FIGS. 12A-12D illustrate plots based on optical analysis of a −4.00 D lens in both primary and inverted or inside-out orientations.
Figure 12B:
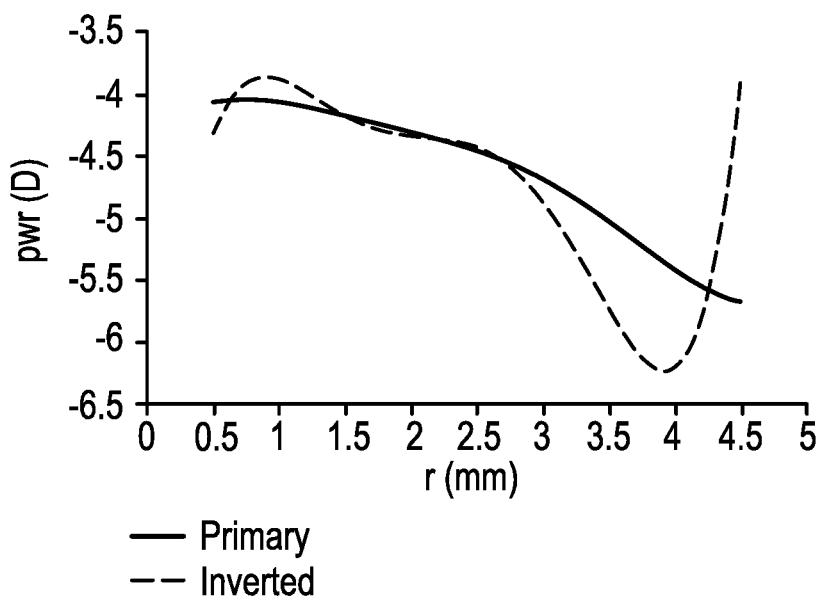
Figure 12C:
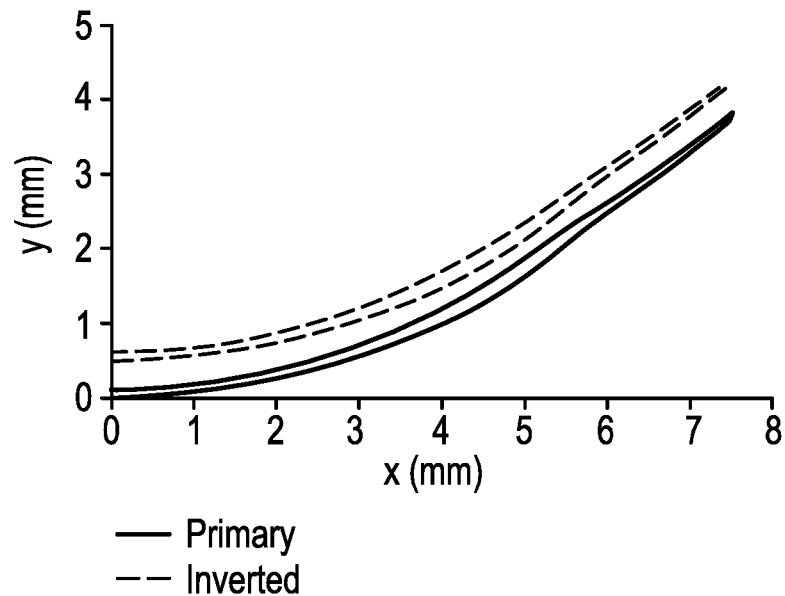
Figure 12D:
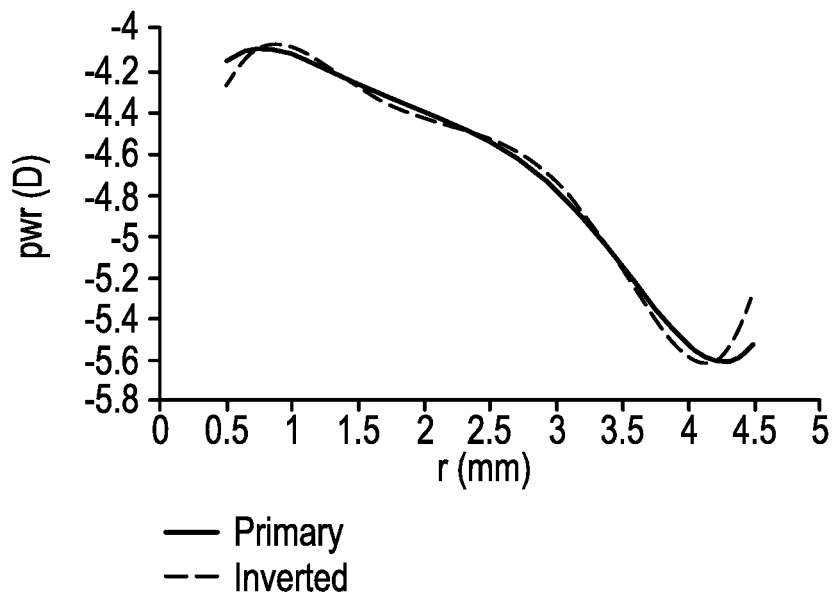

FIGS. 12A-12D illustrate plots based on optical analysis of a −4.00 D lens in both primary and inverted or inside-out orientations. The plots compare the lens profiles and their calculated optical power profiles. They show there is minimal differences between the two sides (FIGS. 12A-12B). Particularly when the lenses wrap on eye, the differences between the power profiles vanishes (FIGS. 12C-12D), as the geometries become equivalent.

Figure 13A:
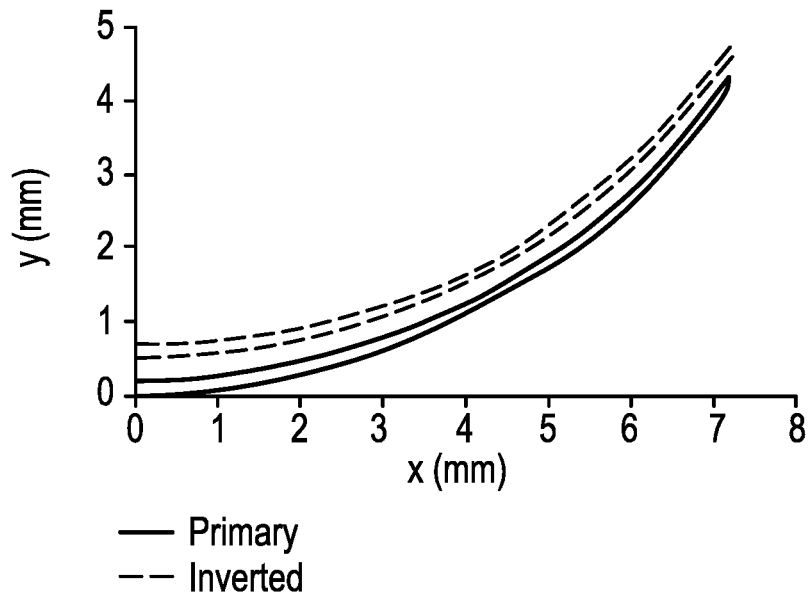
FIGS. 13A-13D illustrate plots based on optical analysis of a +4.00 D lens in both primary and inverted or inside-out orientations.
Figure 13B:
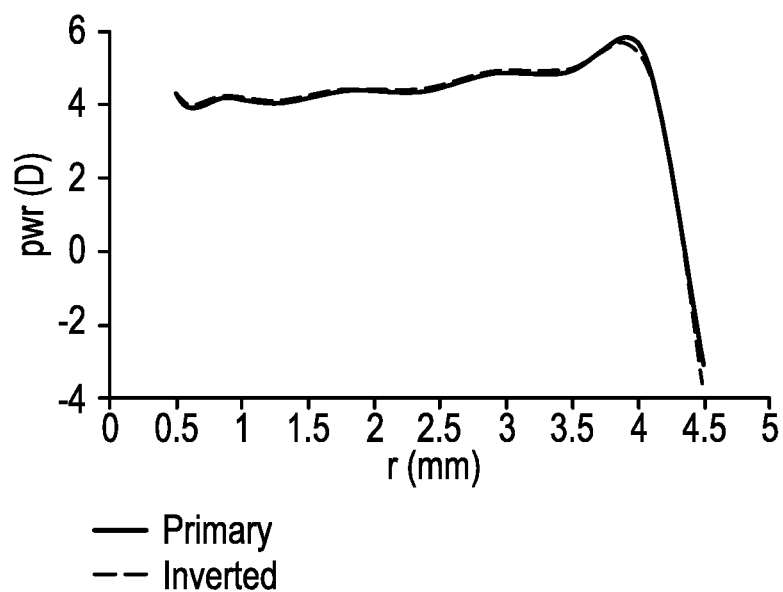
Figure 13C:
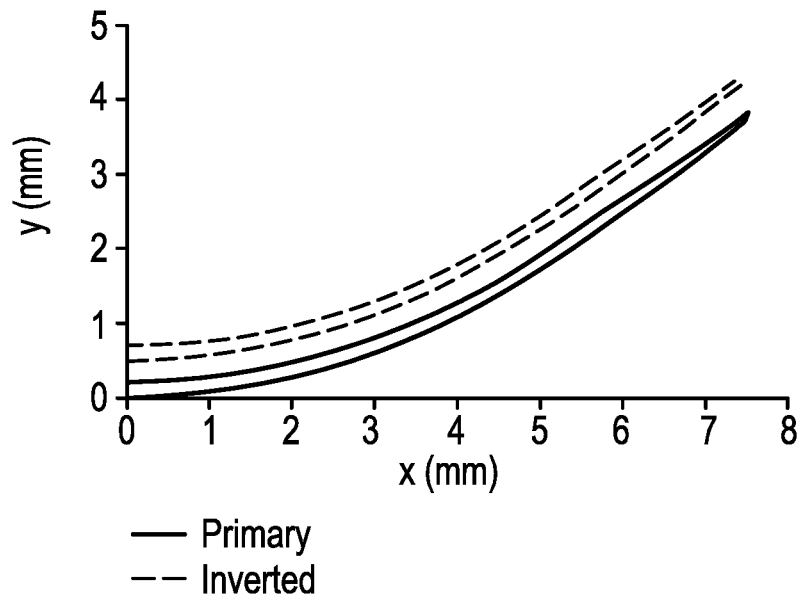
Figure 13D:
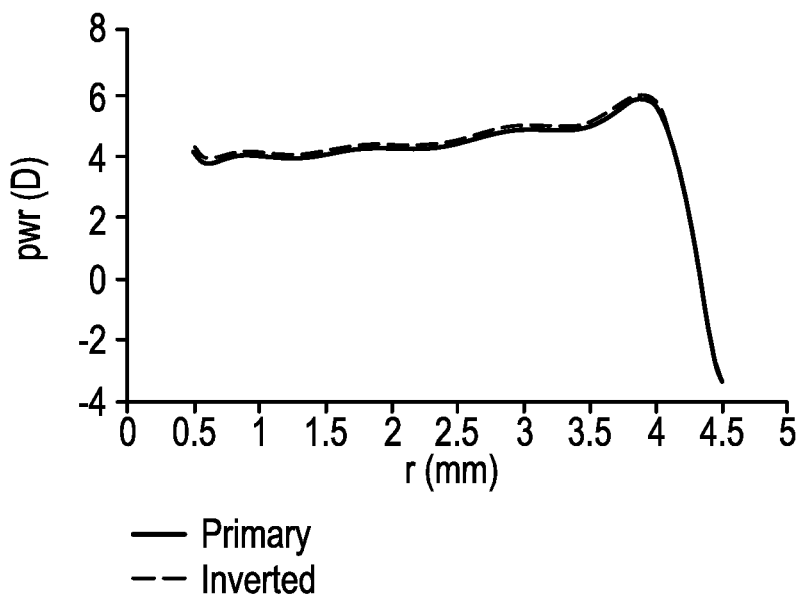

FIGS. 13A-13D illustrate plots based optical analysis of a +4.00 D lens in both primary and inverted or inside-out orientations. The plots compare the lens profiles and their calculated optical power profiles. They show there is minimal differences between the two sides (FIGS. 13A-13B). Particularly when the lenses wrap on eye, the differences between the power profiles vanishes (FIGS. 13C-13D), as the geometries become equivalent.

These opto-mechanical simulations support the notion that the vision through the invertible lens design in accordance with the present disclosure maybe independent of the lens orientation.

As described herein, the peripheral region of the lens can be designed in such a way that the disparity in base curve and diameter between the primary and the inside-out orientations is minimized. The impact of peripheral thickness on this disparity, depends on lens diameter, base curve, and center thickness which have to be optimized along with the peripheral thickness for the best performance. When the lens base curve and diameter are comparable between the primary and the inside-out orientations, the on-eye fit and vision performance are expected to be comparable.

Moreover, printing on a lens design that can be inverted may provide an interchangeable (e.g., reversible) cosmetic appearance on eye. This effect may comprise a change in one or more of a color, a pattern, or an effect. The resulting interchangeable cosmetic appearance may be customized based on print order, design/pattern, colors, pattern alignment, and opacity levels, etc.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:

1. A contact lens to be worn on an eye of a wearer, comprising:
   a main body comprising a first surface and a second surface opposite the first surface, the main body having a diameter, a base curve, a peripheral thickness, a center thickness, and a predetermined spherical power to provide substantially corrected vision when worn on the eye of the wearer;
   wherein, one or more of the diameter, the base curve, the peripheral thickness, or the center thickness are configured such that a dsag is less than 1.3% when comparing a first orientation of the main body with at least a portion of the first surface abutting an eye of a wearer and a second orientation of the main body with at least a portion of the second surface abutting the eye of the wearer, and wherein dsag is the deviation in sag; and
   wherein said lens is adapted to be invertible such that said lens provides said substantially corrected vision when either the first surface or the second surface is abutting the eye of the wearer.

2. The ophthalmic lens of claim 1, wherein, one or more of the diameter, the base curve, the peripheral thickness, or the center thickness are configured such that a dsag is less than 1.2% when comparing a first orientation of the main body with at least a portion of the first surface abutting an eye of a wearer and a second orientation of the main body with at least a portion of the second surface abutting the eye of the wearer.

3. The ophthalmic lens of claim 1, wherein, one or more of the diameter, the base curve, the peripheral thickness, or the center thickness are configured such that a dsag is less than 1.1% when comparing a first orientation of the main body with at least a portion of the first surface abutting an eye of a wearer and a second orientation of the main body with at least a portion of the second surface abutting the eye of the wearer.

4. The ophthalmic lens of claim 1, wherein, one or more of the diameter, the base curve, the peripheral thickness, or the center thickness are configured such that a dsag is less than 1.0% when comparing a first orientation of the main body with at least a portion of the first surface abutting an eye of a wearer and a second orientation of the main body with at least a portion of the second surface abutting the eye of the wearer.

5. The ophthalmic lens of claim 1, wherein the main body exhibits a modulus of elasticity of between 150 kPa and 1000 kPa as measured in accordance with ANSI Z80.20.

6. The ophthalmic lens of claim 1, wherein the main body exhibits a modulus of elasticity between 270 kPa and 1000 kPa as measured in accordance with ANSI Z80.20.

7. The ophthalmic lens of claim 1, wherein the main body exhibits a modulus of elasticity between 420 kPa and 1000 kPa as measured in accordance with ANSI Z80.20.

8. The ophthalmic lens of claim 1, wherein the diameter of the main body is between 13.8 mm and 15 mm.

9. The ophthalmic lens of claim 1, wherein the diameter of the main body is between 14.3 mm and 14.8 mm.

10. The ophthalmic lens of claim 1, wherein the base curve of the main body is between 8 mm and 8.6 mm.

11. The ophthalmic lens of claim 1, wherein the base curve of the main body is between 8 mm and 8.3 mm.

12. The ophthalmic lens of claim 1, wherein the base curve of the main body is between 8 mm and 8.1 mm.

13. The ophthalmic lens of claim 1, wherein the center thickness of the main body is between 0.06 mm and 0.2 mm.

14. The ophthalmic lens of claim 1, wherein the center thickness of the main body is between 0.1 mm and 0.2 mm.

15. A method of making the ophthalmic lens of claim 1.

16. A contact lens to be worn on an eye of a wearer, comprising:
   a main body comprising a first surface and a second surface opposite the first surface, the main body having a diameter, a base curve, a thickness profile, an edge profile, and a predetermined spherical power to provide substantially corrected vision when worn on the eye of the wearer;

wherein, the edge profile and one or more of the diameter, the base curve, or the thickness profile are configured such that an apex height measured from an edge apex to a nearest surface of the eye is less than or equal to 0.020 mm when the lens is in an inverted orientation with at least a portion of the second surface abutting the eye of the wearer, and wherein said lens is adapted to be invertible such that said lens provides said substantially corrected vision when either the first surface or the second surface is abutting the eye of the wearer.

17. The ophthalmic lens of claim 16, wherein the edge profile and one or more of the diameter, the base curve, or the thickness profile are configured such that a dsag is less than 1.2% when comparing a first orientation of the main body with at least a portion of the first surface abutting an eye of a wearer and a second orientation of the main body with at least a portion of the second surface abutting the eye of the wearer, and wherein dsag is the deviation in sag.

18. The ophthalmic lens of claim 16, wherein the edge profile and one or more of the diameter, the base curve, or the thickness profile are configured such that a dsag is less than 1.1% when comparing a first orientation of the main body with at least a portion of the first surface abutting an eye of a wearer and a second orientation of the main body with at least a portion of the second surface abutting the eye of the wearer, wherein dsag is the deviation in sag.

19. The ophthalmic lens of claim 16, wherein the edge profile and one or more of the diameter, the base curve, or the thickness profile are configured such that a dsag is less than 1.0% when comparing a first orientation of the main body with at least a portion of the first surface abutting an eye of a wearer and a second orientation of the main body with at least a portion of the second surface abutting the eye of the wearer, wherein dsag is the deviation in sag.

20. The ophthalmic lens of claim 16, wherein the main body exhibits a modulus of elasticity of between 150 kPa and 1000 kPa as measured in accordance with ANSI Z80.20.

21. The ophthalmic lens of claim 16, wherein the main body exhibits a modulus of elasticity between 270 kPa and 1000 kPa as measured in accordance with ANSI Z80.20.

22. The ophthalmic lens of claim 16, wherein the main body exhibits a modulus of elasticity between 420 kPa and 1000 kPa as measured in accordance with ANSI Z80.20.

23. The ophthalmic lens of claim 16, wherein the diameter of the main body is between 13.8 mm and 15 mm.

24. The ophthalmic lens of claim 16, wherein the diameter of the main body is between 14.3 mm and 14.8 mm.

25. The ophthalmic lens of claim 16, wherein the base curve of the main body is between 8 mm and 8.6 mm.

26. The ophthalmic lens of claim 16, wherein the base curve of the main body is between 8 mm and 8.3 mm.

27. The ophthalmic lens of claim 16, wherein the base curve of the main body is between 8 mm and 8.1 mm.

28. The ophthalmic lens of claim 16, wherein the center thickness of the main body is between 0.06 mm and 0.2 mm.

29. The ophthalmic lens of claim 16, wherein the center thickness of the main body is between 0.1 mm and 0.2 mm.

30. A method of making the ophthalmic lens of claim 16.

\* \* \* \* \*